United States Patent

[11] 3,629,925

[72] Inventors William N. Brown, Jr.;
Robert J. Eminger, both of Fort Wayne, Ind.
[21] Appl. No. 881,977
[22] Filed Dec. 4, 1969
[45] Patented Dec. 28, 1971
[73] Assignee Essex International, Inc.
Fort Wayne, Ind.

[54] APPARATUS FOR COMPACTING DYNAMOELECTRIC MACHINE COILS WITH MEANS FOR PREVENTING LAMINATION DISTORTION
15 Claims, 6 Drawing Figs.

[52] U.S. Cl. ..................................... 29/205 D,
29/596, 29/606
[51] Int. Cl. ....................................... H02k 15/00
[50] Field of Search ........................... 29/205 R,
205 D, 596, 606, 598

[56] References Cited
UNITED STATES PATENTS

| | | | |
|---|---|---|---|
| 3,412,453 | 11/1968 | Larsen | 29/205 D |
| 3,484,923 | 12/1969 | Peters | 29/205 R |
| 3,534,460 | 10/1970 | Rushing | 29/205 D |

Primary Examiner—John F. Campbell
Assistant Examiner—Carl E. Hall

Attorney—Hood, Gust, Irish & Lundy

ABSTRACT: Electrical surge apparatus for compacting dynamoelectric machine coils in the slots of an internally slotted, laminated stator core member and for forming the end turn portions of the coils outwardly away from the bore of the core member, which includes a resilient sleeve engaging the bore of the core and having portions extending axially outwardly beyond each end face, an expansible conductive sleeve engaging the inner surface of the resilient sleeve, a second resilient sleeve engaging the inner surface of the conductive sleeve, and a mandrel extending through and engaging the inner surface of the second resilient sleeve. A first compressing member mounted on one end of the mandrel engages one end of the second resilient sleeve and a second compressing member surrounds the mandrel and engages the other end of the second resilient sleeve. A fluid power cylinder is arranged to move the two compressing members toward each other so as to compress the second resilient sleeve therebetween thereby deforming the second resilient sleeve radially outwardly, expanding the conductive sleeve radially outwardly, and compressing the first resilient sleeve radially outwardly against the bore of the core so that the projecting portions are deformed radially outwardly respectively into engagement with the outer surfaces of the inner ends of the teeth of the respective end laminations of the core so as to prevent distortion of the teeth ends during application of the electrical surge to the field coils

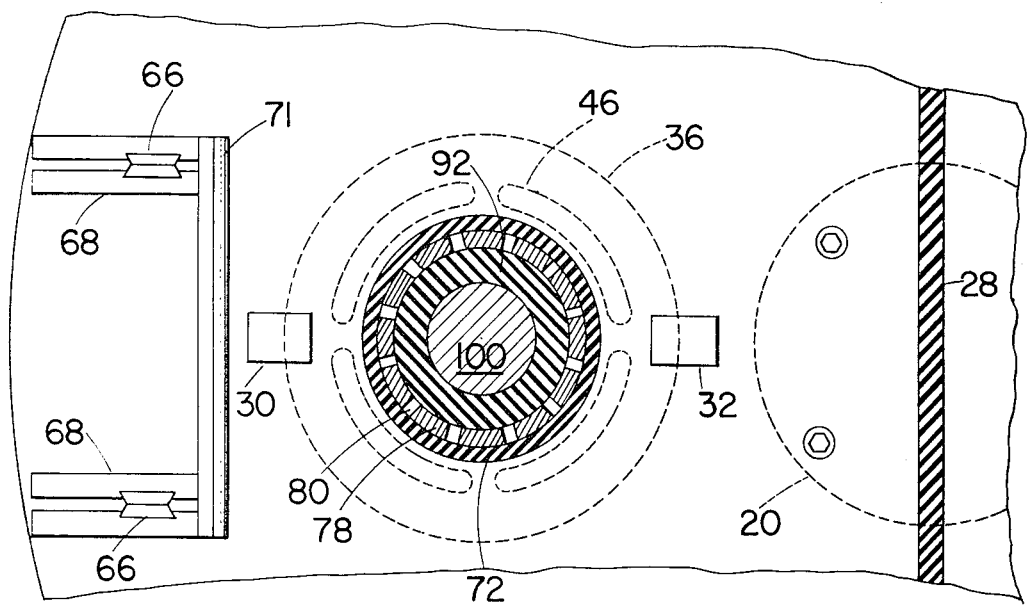
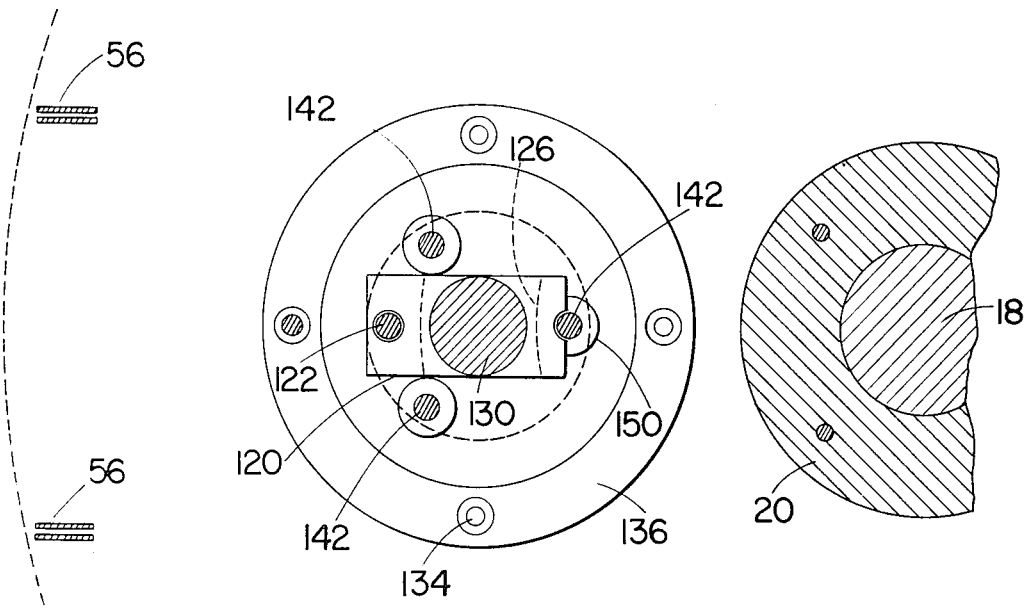

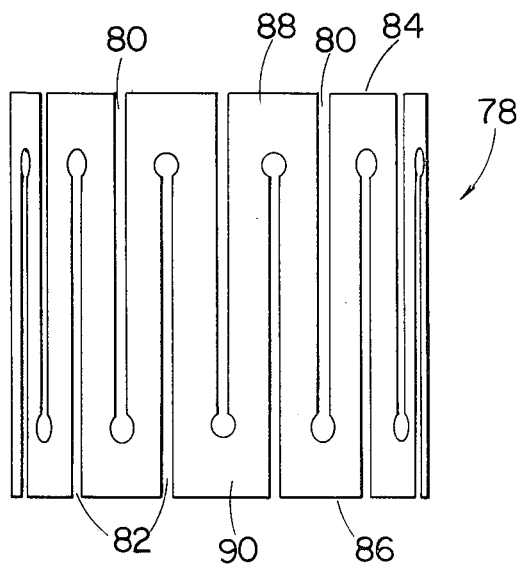
FIG_4
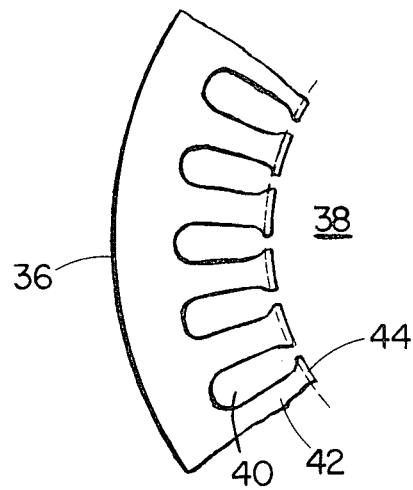
FIG_6

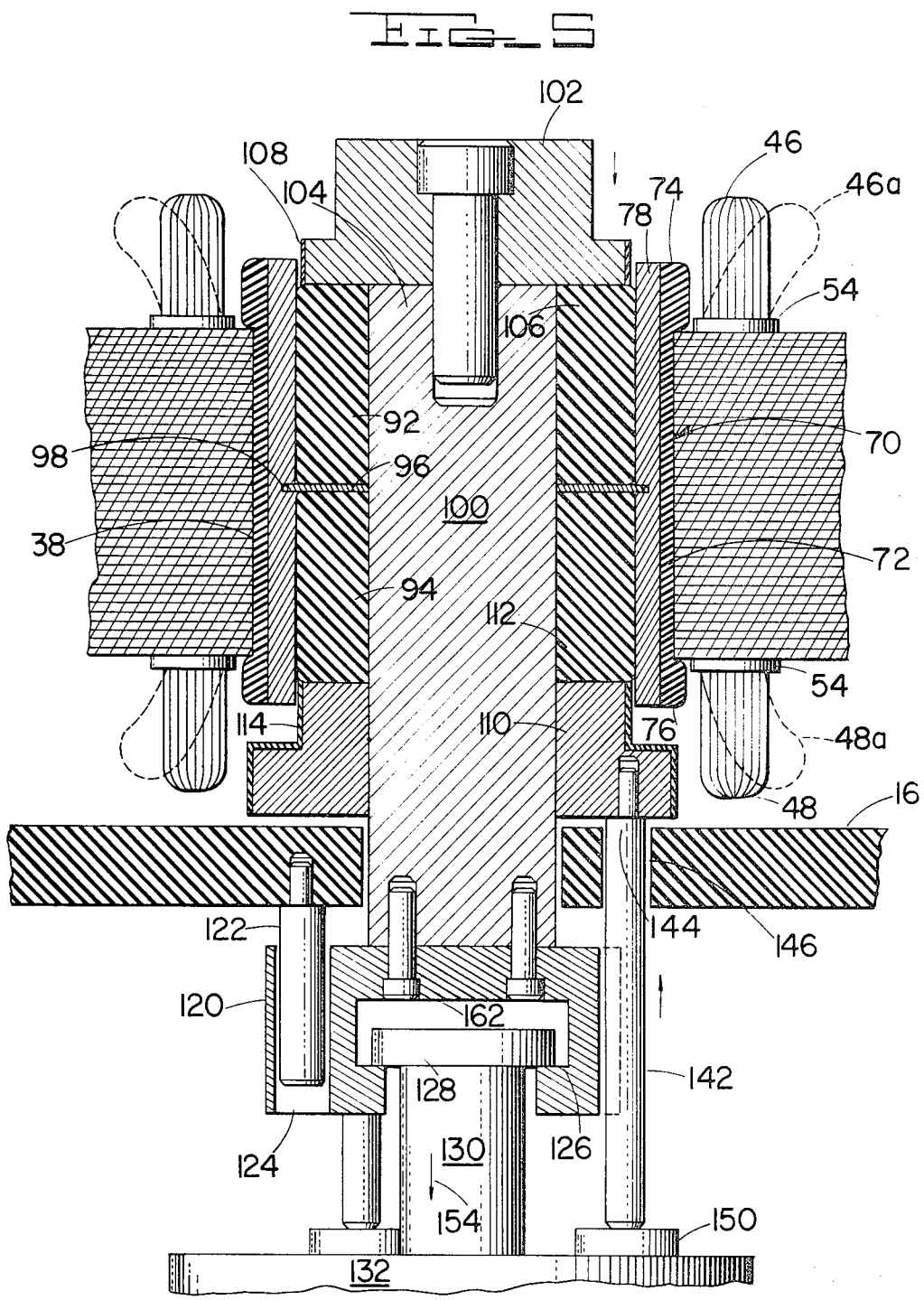

APPARATUS FOR COMPACTING DYNAMOELECTRIC MACHINE COILS WITH MEANS FOR PREVENTING LAMINATION DISTORTION

BACKGROUND OF THE INVENTION

1. Field of the Invention

This invention relates generally to apparatus of the electrical surge type for compacting and forming dynamoelectric machine field coils, and more particularly to such apparatus including means for preventing deformation of the end laminations of the core during application of the electrical surge to the coils.

2. Description of the Prior Art

U.S. Pats. Nos. 3,333,327, 3,333,300 and 3,333,335 disclose various methods for compacting dynamoelectric machine field coils in the slots of an internally slotted, laminated stator core member, and for forming the end turn portions of the coils upwardly away from the bore of the core member, by the application of high voltage electrical surges to the coils, and U.S. Pat. No. 3,407,468 discloses apparatus which may be employed for performing such methods. Conventional stator core members for dynamoelectric machines comprise a stacked plurality of relatively thin laminations of magnetic material having a central bore which receives the rotor member of the machine. A plurality of slots extend radially outwardly from the bore for receiving the field coils of the machine, such slots being defined by radially extending teeth therebetween. In certain dynamoelectric machines, such as certain four-pole, single phase alternating current motors, a relatively large number of such slots are provided, such as 36 or 48, the intervening teeth consequently being relatively narrow.

The sudden application of a high voltage pulse or surge to the coils positioned in the core member slots results in nearly instantaneous outward deflection of the end turns of the coils which project outwardly beyond the opposite end faces of the core. Such nearly instantaneous outward deflection of the end turns tends to shorten the chord of the coils, and it has been found that the high forces exerted by the end turns on the outer laminations respectively adjacent the opposite end faces of the core during the application of the surge tend to outwardly bend the ends of the teeth of such outer laminations.

It is therefore desirable to incorporate in apparatus of the general type disclosed in the aforesaid U.S. Pat. No. 3,407,468, a mechanism which will prevent such bending of the ends of the teeth of the outer laminations.

SUMMARY OF THE INVENTION

In its broader aspects, the invention provides means for supporting a stator core member with the field coils positioned in the slots thereof, and a mechanism for preventing distortion of the ends of the teeth of the end laminations at at least one end face of the core during the application of the electrical surge to the coils. The mechanism includes a member positioned in the bore of the core member when on the support means and having an expansible portion which extends axially outwardly beyond the end lamination at the one end face of the core. Means are provided for expanding the expansible portion radially outwardly into engagement with the outer surface of the inner ends of the teeth of the end lamination thereby preventing distortion of the teeth ends during application of the surge.

It is accordingly an object of the invention to provide improved electrical surge apparatus for compacting and forming dynamoelectric machine field coils.

Another object of the invention is to provide improved electrical surge apparatus for compacting and forming dynamoelectric machine field coils including means for preventing distortion of the inner ends of the core teeth during application of the electrical surge.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a fragmentary, top cross-sectional view taken generally along the line 2—2 of FIG. 1;

FIG. 3 is a fragmentary, bottom cross-sectional view taken generally along the line 3—3 of FIG. 1;

FIG. 4 is a side view of the expansible conductive sleeve employed in the apparatus of FIG. 1;

FIG. 5 is a fragmentary, cross-sectional view similar to FIG. 1 but showing the mechanism in its actuated position; and FIG. 6 is a fragmentary top view of one end face of the stator core member showing the cooperative relationship of the outer resilient sleeve therewith upon actuation of the mechanism of FIGS. 1 and 5.

DESCRIPTION OF THE PREFERRED EMBODIMENT

Figure 1:
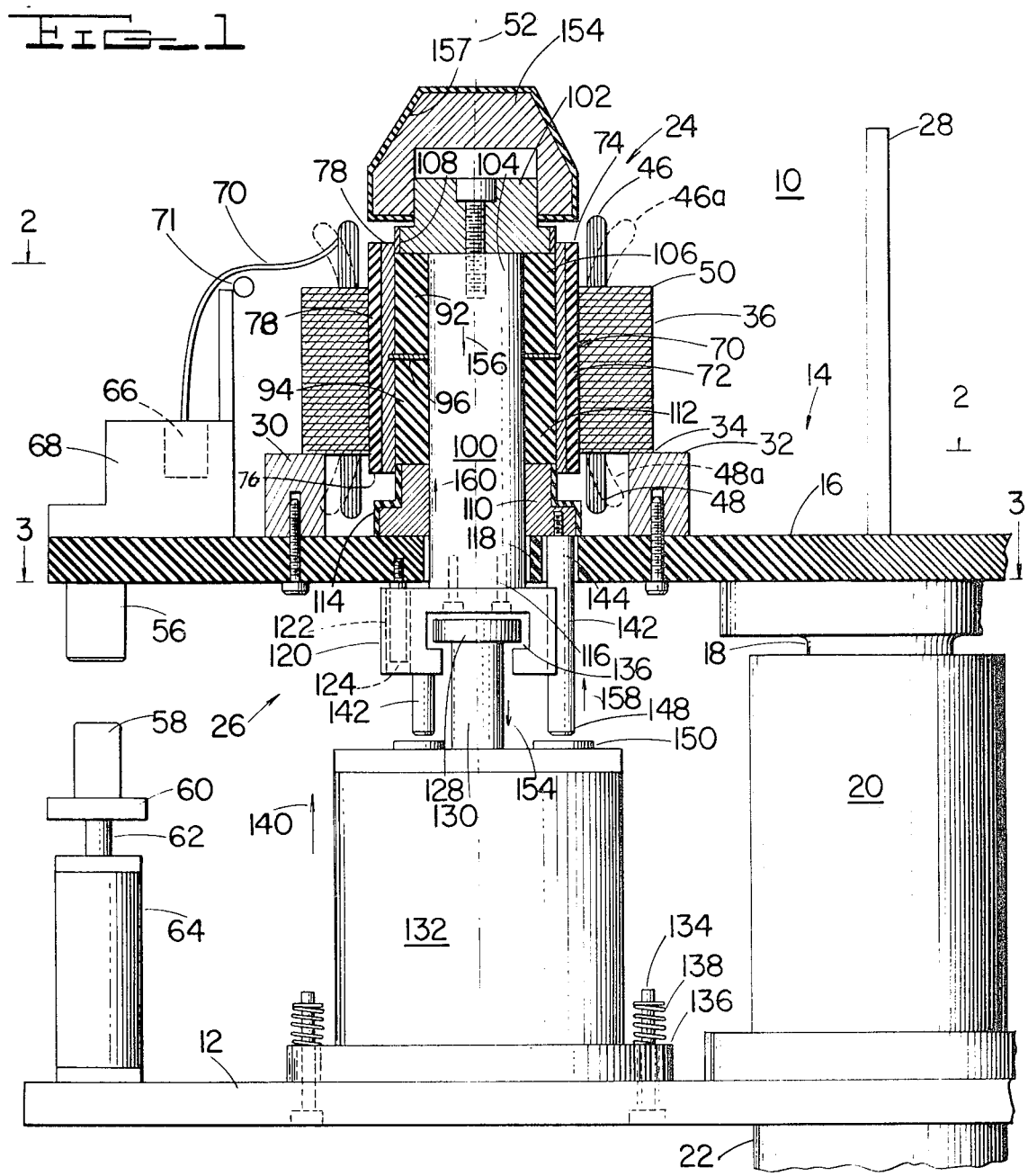
FIG. 1 is a side cross-sectional view showing the apparatus of the invention prior to actuation thereof to support the ends of the teeth of the end laminations thereby to prevent distortion thereof during application of the surge.

Referring now to the figures of the drawings, the improved electrical surge apparatus of the invention, generally indicated at 10, includes a base plate member 12 which forms a part of a frame (not shown). A turntable assembly 14 is provided including a top turntable plate member 16, formed of suitable insulating material, mounted on a shaft 18 and rotatably supported above bottom plate 12 by a suitable bearing assembly 20. A suitable index drive motor 22 is coupled to shaft 18 for rotating turntable assembly 14.

A pair of stator supporting assemblies, which incorporate the mechanism of the invention, are provided mounted on top plate 16 at diametrically opposite positions, only one such supporting assembly being shown at 24. The two supporting assemblies are selectively rotated by turntable assembly 14 between an electrical surge applying station 26, shown in FIG. 1, and a diametrically opposite loading and unloading station (not shown). An insulating partition 28 extends diametrically across top turntable plate 16 and upwardly therefrom so as to isolate the surge station 26 from the loading and unloading station.

Support assembly 24 comprises a pair of stator core support members 30, 32 mounted on top plate 16 for supporting bottom lamination 34 of stator core member 36. Stator core member 36 is conventionally formed of a stacked plurality of relatively thin stacked laminations of magnetic material and has a central bore 38 with coil accommodating slots 40 extending radially outwardly therefrom and defining radially inwardly extending teeth 42 therebetween having inner ends 44 which define bore 38. Stator core member 36 when positioned on support members 30, 32 has conventional field coils previously positioned in slots 40 with end turn portions 46, 48 extending axially outwardly beyond the slots and beyond the opposite end laminations 34, 50 of core member 36. End turns 46, 48 when initially positioned in slots 40 of core member 36, as by means of conventional gun-type winding apparatus or coil injection apparatus, initially extend generally axially outwardly from the opposite end laminations 34, 50, generally parallel with the axis 52 of bore 38. Slots 40 may have conventional insulating slot liners therein which accommodate the field coils and insulate the coils from the edges of the laminations forming core 36, the slot insulators having cuff portions 54 which respectively extend outwardly beyond the respective slot opening and beyond the opposite end laminations 34, 50 (FIG. 5).

A pair of knife blade contact elements 56 are mounted on turntable plate 16, and a pair of complementary knife blade contact elements 58 are provided mounted on bridge 60 which, in turn, is mounted on piston rod 62 of a conventional fluid power cylinder 64 (FIG. 1). It will be seen that actuation of cylinder 64 to extend its piston rod 62 will move bridge 60 and knife blade contact elements 58 upwardly cooperatively to engage knife blade contact elements 56. A pair of electrical contact elements 66, such as those disclosed in U.S. Pat. No. 3,391,379, are mounted on support 68, in turn mounted on the upper surface of turntable plate 16 adjacent its outer periphery. Leads 70 extending from the coils in the slots of core member 36 extend over insulator rod 71 and are respectively inserted in contact elements 66, as described in the aforesaid U.S. Pat. No. 3,391,379. Contact elements 66 are electrically connected to knife blade contact elements 56, and movable knife blade elements 58 are adapted to be connected to a suitable source of electrical surge energy (not shown). Thus, upon actuation of fluid power cylinder 64 thereby to close the complementary knife blade contacts 56, 58 a source of electrical surge energy is coupled to the coils in the slots 40 of stator core member 36.

When the high voltage electrical surge is applied to the coils in slots 40 of core member 36, as taught by the aforesaid patents, the wires forming the portions of the coils respectively positioned in slots 40 are virtually instantaneously forced radially outwardly in the slots thereby compacting the coils in the slots, and the end turn portions 46, 48 are likewise virtually instantaneously forced radially outwardly away from the bore 38 of the core member 36, as shown in dashed lines at 46a, 48a. When the electrical surge is applied to the coils resulting in such virtually instantaneous outward deflection of end turns 46, 48 from their initial to their formed positions 46a, 48a, the chord of the coils is shortened and the very substantial forces involved tend to outwardly bend or deform the ends 44 of the teeth 42 of the end laminations 34, 50, and several laminations adjacent thereto. In order to prevent this outward deformation of ends 44 of the teeth 42 adjacent the opposite ends of core member 36, the mechanism now to be described is provided.

A sleeve 70 of suitable resilient material, such as rubber, is provided having a central portion 72 which engages the bore 38 of core 36, and opposite end portions 74, 76 which respectively extend axially outwardly beyond the opposite end laminations 34, 50. An expansible sleeve 78 of conductive, nonmagnetic material, such as copper, is provided engaging the inner surface of the resilient sleeve 70. Electrically, conductive sleeve 78 forms an essential component of electrical surge apparatus, as described in the aforesaid patents. Referring particularly to FIG. 4, sleeve 78 which is basically in the form of a cylinder, is rendered radially outwardly expansible by a plurality of elongated slots 80, 82 alternately extending axially from opposite ends 84, 86, each such slot 80 thus being disposed between a pair of adjacent slots 82, and extending in the opposite direction, and vice versa. Thus, each adjacent pair of slots 80 define a resilient segment 88, and each adjacent pair of slots 82 define a resilient segment 90 thus rendering sleeve 78 resiliently outwardly expansible. Conductive sleeve 78 is generally coextensive in length with the outer resilient sleeve 70.

A pair of inner sleeve parts 92, 94 are provided likewise respectively formed of suitable resilient material, such as rubber. Sleeve parts 92, 94 are generally of the same length and are spaced apart by an annular spacing member 96 having its outer edge slidably seated in annular groove 98 formed in the interior surface of conductive sleeve 78, as best seen in FIG. 5. Inner resilient sleeve parts 92, 94 respectively engage the inner surface of conductive sleeve 78.

An elongated mandrel 100 is provided extending through and engaging the inner surfaces of the inner resilient sleeve parts 92, 94. An upper compressing member 102 is secured to upper end 104 of mandrel 100 and engages upper end 106 of inner resilient sleeve part 92. Mandrel 100 and compressing member 102 may be formed of suitable metal, peripheral edge 108 of compressing member 102 being coated with suitable insulating material, as shown.

A lower, annular compressing member 110 is provided surrounding mandrel 100 to permit relative axial movement of mandrel 100, lower compressing member 110 normally being seated upon the upper surface of turntable plate 16 and engaging the lower end 112 of the inner resilient sleeve part 94. Compressing member 110 is likewise formed of suitable metal and has its peripheral surface 114 coated with suitable insulating material.

Mandrel 100 has an extension portion 116 extending downwardly beyond inner resilient sleeve part 94 and lower compressing member 110, through an opening 118 in turntable plate 16. It will be observed that mandrel 100 together with inner resilient sleeve parts 92, 94, expansible conductive sleeve 78, and outer resilient sleeve 70 are coaxial with axis 52 of bore 38 of core 36.

A clevis member 120 is secured to lower end 116 of mandrel 100, being disposed below the bottom surface of turntable plate 16. Clevis member 120 is guided for axial movement by a guide pin 122 secured to turntable plate 16 and slidably received in opening 124 in clevis member 120. Clevis member 120 has a notch 126 formed therein which receives annular ring 128 at the upper end of piston rod 130 of fluid power cylinder 132. As will hereinafter be more fully described, fluid power cylinder 132 is mounted on base plate 12 in free-floating fashion, being restrained against lateral movement by means of suitable pins 134 secured to base plate 12 and extending through openings in its mounting flange 136. Suitable coil springs 138 surround pins 134 and have their opposite ends respectively engaging mounting flange 136 and an abutment at the upper end of pins 134. Thus, cylinder 132 may move upwardly in the direction shown by the arrow 140 against the force exerted by springs 138.

Each of the core support assemblies 24 (only one of which is shown) include knife blade contact elements 56 and the mandrel and clevis assembly 100, 120, whereas the movable knife blade contact assembly 58, 60, 62, 64 and fluid power cylinder 132 is located only at the surge station 26. It will thus be understood that when the turntable plate 16 is rotated thereby to rotate a support assembly 24 with the core 36 supported thereon having its coils previously positioned therein, from the loading and unloading station to the surge station, knife blade contact elements 56 move into proper alignment with the movable knife blade contact elements 58, and clevis 120 moves into cooperative relationship with annular member 128 and piston rod 130 of cylinder 132.

A plurality (three being shown) of push rods 142 are provided having their upper ends 144 secured to the lower compressing member 110 and extending downwardly through openings 146 in turntable plate 16. Lower ends 148 of push rods 142 are normally slightly spaced from wear pads 150 secured to the top surface 152 of cylinder 132.

A cap member 154 may be provided secured to the upper compressing member 102 and having its outer peripheral surface 157 coated with suitable insulating material.

OPERATION

With the apparatus positioned as shown in FIG. 1, cylinder 132 is actuated thereby to retract piston rod 130 in the direction shown by the arrow 154, thereby causing annular member 128 to engage notch 126 in clevis member 120 so as to move mandrel 100 and upper compressing member 102 downwardly, as shown by the arrow 156. The restraint against such downward movement of mandrel 100 and upper compressing member 102 exerted by lower compressing member 110 and inner resilient sleeve parts 92, 94 results in cylinder 132 being pulled upwardly in direction 140 against springs 138 so that wear pads 150 engage lower ends 148 of push rods 142, thereby moving push rods 142 upwardly in the direction shown by arrow 158, resulting in upward movement of the lower compressing member 110 in the direction shown by the arrow 160. Thus, continued retraction of piston rod 130 of cylinder 132 results in simultaneous downward movement of mandrel 100 and upper compressing member 102 in direction 156, and upward movement of the lower compressing member 110 in direction 160, thereby to compress inner resilient sleeve parts 92, 94 between the two compressing members 102, 110.

Such compressing of inner resilient sleeve parts 92, 94 results in radially outward deformation of inner resilient sleeve parts 92, 94 thereby applying radially outward force on the inner surface of expansible conductive sleeve 78 to expand the same radially outwardly. Such radially outward expansion of conductive sleeve 78 compresses the central portion 72 of the outer resilient sleeve 70 against bore 38 of core 36 resulting in radially outward deformation of end portions 74, 76 thereof so that the end portions 74, 76 are expanded radially outwardly respectively into engagement with the outer surfaces of the inner ends 44 of the teeth 42 of the outer laminations 34, 50 of core 36, as shown in FIGS. 5 and 6. Such engagement of the deformed outer ends 74, 76 of the outer resilient sleeve 70 with the inner ends 44 of the teeth of the outer laminations 50, 34 supports the inner ends of the teeth and prevents distortion thereof during application of the electrical surge to the field coils which results in outward deflection of end turns 46, 48 to their positions 46a, 48a.

After actuation of the apparatus to the position shown in FIG. 5 in which the inner ends 44 of teeth 42 of the outer laminations 50, 34 are supported so as to prevent deformation thereof, an electrical surge is applied as described in the aforesaid patents. Following application of the electrical surge, cylinder 132 is actuated in the opposite direction causing annular member 128 at the end of piston rod 130 to engage the upper surface 162 of clevis member 120, thereby to move mandrel 100 and upper compressing member 102 upwardly, and permitting the lower compressing member 110 to return to its normal position in engagement with the upper surface of turntable plate 16, as shown in FIG. 1. The resulting separating movement of compressing members 102, 110 removes the compressive force from inner resilient sleeve parts 92, 94 so that they elongate axially and remove the outwardly expanding force from the conductive sleeve 78, which thus resiliently returns to its normal unexpanded condition. This, in turn, removes the compressive force from the center portion 72 of the outer resilient sleeve 70, so that it too returns to its uncompressed state, thus resulting in retraction of the previously deformed end portions 74, 76. With the position of the apparatus thus restored to that shown in FIG. 1, turntable plate 16 may be rotated thereby to rotate support assembly 24 and the completed core and coil assembly to the unloading station upon disconnection of leads 70 from the contact elements 66. Upon arrival at the unloading station, the core member 36 with the compressed coils therein may then be removed from the central plug assembly which comprises mandrel 100, inner resilient sleeve parts 92, 94, expansible conductive sleeve 78 and outer resilient sleeve 70.

It will now be seen that in accordance with the invention there is provided electrical surge apparatus for compacting dynamoelectric machine field coils in the slots of an internally slotted, laminated stator core member which not only provides the requisite conductive element disposed within the bore of the core member, but which when actuated, as above-described, supports the inner ends of the teeth of the end laminations of the core thereby to prevent bending or deformation of the ends of the teeth adjacent the opposite end faces of the core during application of the electrical surge.

While there have been described above the principles of this invention in connection with specific apparatus, it is to be clearly understood that this description is made only by way of example and not as a limitation to the scope of the invention.

We claim:

1. In electrical surge apparatus for compacting dynamoelectric machine field coils in the slots of an internally slotted, laminated stator core member and for forming the end turn portions of said coils outwardly away from the bore thereof: means for supporting a stator core member with the field coils positioned in the slots thereof; a member positioned in said bore of said core member when on said support means and having an expansible portion extending axially outwardly beyond the end lamination at one end face of said core; and means for expanding said portion radially outwardly into engagement with the outer surface of the inner ends of the teeth of said end lamination which define said slots therebetween thereby to prevent distortion of said teeth ends during application of the electrical surge to said field coils.

2. The apparatus of claim 1 wherein said member extends through said bore and has a second expansible portion extending axially outwardly beyond the end lamination at the other end face of said core, said expanding means also expanding said second portion radially outwardly into engagement with the outer surface of the inner ends of the teeth of said last-named end lamination.

3. The apparatus of claim 1 wherein said member is formed of resilient material.

4. The apparatus of claim 1 wherein said member comprises a sleeve of resilient material having another portion engaging the surface of said bore, said expanding means including means for compressing said other portion radially outwardly against said bore surface thereby deforming said expansible portion radially outwardly.

5. The apparatus of claim 4 wherein said compressing means includes a member of conductive material engaging the inner surface of both said expansible and other portions of said resilient sleeve, said conductive member having means for radially expanding the same thereby to compress said other sleeve portion.

6. The apparatus of claim 5 wherein said conductive member is a sleeve, said last-named expanding means comprising a plurality of elongated slots formed in said conductive sleeve and extending axially alternately in opposite directions from the opposite ends thereof thereby defining a plurality of resiliently expandable segments.

7. The apparatus of claim 6 wherein said compressing means further includes means engaging the interior of said conductive sleeve for forcing said segments radially outwardly thereby to compress said resilient sleeve.

8. The apparatus of claim 7 wherein said forcing means comprises a second sleeve of resilient material, a rigid mandrel engaging the interior of said second sleeve, and means for axially compressing said second sleeve thereby causing the same to deform radially outwardly against said conductive sleeve.

9. The apparatus of claim 8 wherein said axial compressing means comprises first means for engaging one end of said second sleeve, second means on said mandrel for engaging the other end of said sleeve, and means for moving said mandrel axially in one direction thereby to compress said second sleeve between said first and second engaging means.

10. The apparatus of claim 9 wherein said axial compressing means further comprises second means for moving said first engaging means axially in a direction opposite said one direction simultaneously with said movement of said mandrel and second engaging means in said one direction.

11. The apparatus of claim 10 wherein said first-named moving means comprises a free-floating fluid power cylinder having a piston rod connected to said mandrel, said second moving means comprising at least one push-rod connected to one of said first engaging means and cylinder and normally axially spaced from the other whereby retraction of said piston rod causes said mandrel and second engaging means to move in said one direction and said push rod to engage the other of said first engaging means and cylinder thereby simultaneously to move said first engaging means in said opposite direction.

12. The apparatus of claim 10 wherein said second sleeve comprises first and second parts disposed in end-to-end relationship with a spacing member therebetween, said parts being generally equal in length, said first engaging means engaging said first part and said second engaging means engaging said second part, said spacing member being supported by said conductive sleeve.

13. The apparatus of claim 10 wherein said first-named resilient sleeve extends completely through said bore and has a second expansible portion extending axially outwardly beyond the end lamination at the other end face of said core, said conductive sleeve being generally coextensive in length with the axial length of said first-named resilient sleeve and engaging the inner surface of said second expansible portion so that upon expansion of said resilient sleeve, said second expansible portion is deformed radially outwardly into engagement with the outer surfaces of the inner ends of the teeth of said last-named end lamination.

14. The apparatus of claim 13 wherein said mandrel has spaced opposite ends, said second engaging means comprising a second member secured to one end of said mandrel, said mandrel having a portion extending beyond said other end of said second sleeve and terminating at the other end of said mandrel, said first engaging means comprising a first member surrounding said mandrel portion and relatively axially movable with respect thereto, said first-named moving means comprising a free-floating fluid power cylinder having a piston rod connected to said other end of said mandrel, said second moving means comprising at least one push-rod having one end connected to said first member and having its other end normally spaced from said cylinder whereby retraction of said piston rod causes said mandrel and second member to move in said one direction and said other end of said push rod to engage said cylinder thereby simultaneously to move said first member in said opposite direction.

15. The apparatus of claim 14 wherein said mandrel is cylindrical, said second sleeve comprising first and second annular parts disposed in end-to-end relationship with an annular spacing member therebetween, said parts being generally equal in length, said first member engaging said first part and said second member engaging said second part, said spacing member being slidably seated in an annular groove formed in the inner surface of said conductive member generally midway between its ends.

* * * * *